United States Patent
Schenk et al.

(10) Patent No.: US 7,159,212 B2
(45) Date of Patent: Jan. 2, 2007

(54) SYSTEMS AND METHODS FOR IMPLEMENTING SHADER-DRIVEN COMPILATION OF RENDERING ASSETS

(75) Inventors: Eric Schenk, North Vancouver (CA); Paul Lalonde, Victoria (CA)

(73) Assignee: Electronic Arts Inc., Redwood City, CA (US)

( * ) Notice: Subject to any disclaimer, the term of this patent is extended or adjusted under 35 U.S.C. 154(b) by 353 days.

(21) Appl. No.: 10/384,371

(22) Filed: Mar. 7, 2003

(65) Prior Publication Data

US 2004/0003370 A1     Jan. 1, 2004

Related U.S. Application Data

(60) Provisional application No. 60/363,049, filed on Mar. 8, 2002.

(51) Int. Cl.
*G06F 9/45* (2006.01)
(52) U.S. Cl. .................. 717/153; 717/146; 717/152
(58) Field of Classification Search ........ 717/106–109, 717/140–153
See application file for complete search history.

(56) References Cited

U.S. PATENT DOCUMENTS

| | | |
|---|---|---|
| 5,555,201 A | 9/1996 | Dangelo et al. |
| 5,781,184 A | 7/1998 | Wasserman et al. |
| 5,983,069 A | 11/1999 | Cho et al. |
| 6,717,576 B1 * | 4/2004 | Duluk et al. ............ 345/419 |

OTHER PUBLICATIONS

Mark et al., "Compiling to a VLIW fragment pipeline", ACM, pp. 47-55, 2001.*

Barrell, K.F., "The graphical kernel system—a replacement for core" First Australian Conference on Computer Graphics 22-26 (1983).

TIS Committee, *Tool Interface Standard (TIS) Executable and Linking Format (ELF) Specification; Version 1.2* May 1995.

Apodaca and Mantle, "RenderMan: Pursuing the future of graphics," *IEEE Computer Graphics & Applications* 10(4):44-49 (Jul. 1990).

Bogomjakov and Gotsman, "Universal rendering sequences for transparent vertex caching of progressive meshes," In: *Proceedings of Graphics Interface 2001*, pp. 81-90.

Cook, R. L., "Shade trees," *Computer Graphics* 18(3):223-231 (Jul. 1984).

Hanrahan and Lawson, "A language for shading and lighting calculations," *Computer Graphics* 24(4):289-298 (Aug. 1990).

Hoppe, H., "Optimization of mesh locality for transparent vertex caching," *SIGGRAPH* 99:269-276 (1999).

Lander, J., "Skin them bones: Game programming for web generation," *Game Developer Magazine*, 11-16 (May 1998).

Lindholm et al., "A user-programmable vertex engine," *ACM SIGGRAPH 2001*, pp. 149-158 (Aug. 2001).

(Continued)

*Primary Examiner*—Ted T. Vo
(74) *Attorney, Agent, or Firm*—Gerald T. Gray (57) ABSTRACT

Art asset rendering systems and methods in which preprocessing is performed in a compilation process. Geometric data are processed in the compilation process with knowledge of associated shading programs. The data are converted into data structures targeted directly to a target hardware platform, and a code stream is assembled that describes the manipulations required to render these data structures. The compiler includes a front end configured to read the geometric data and attributes (an art asset) output from a 3D modeling package and shaders in a platform independent form and perform platform-independent optimizations, and a back end configured to perform platform-specific optimizations and generate platform-targeted data structures and code streams.

21 Claims, 8 Drawing Sheets

OTHER PUBLICATIONS

Molnar et al., "PixelFlow: High-speed renderig using image composition," *Computer Graphics* 26(2):231-240 (Jul. 1992).

Olano and Lastra, "A shading language on graphics hardware: The PixelFlow shading system," *Proceedings of SIGGRAPH 98*, pp. 1-10 (1998).

Peercy et al., "Interactive multi-pass programmable shading", *SIGGRAPH 2000*, pp. 425-432 (2000).

Perlin, K., "An image synthesizer," *Computer Graphics (Proceedings of SIGGRAPH 85)* 19(3):287-296 (1985).

Proudfoot et al., "A real-time procedural shading system for programmable graphics hardware," *ACM SIGGRAPH 2001*, pp. 159-170 (Aug. 2001).

Stern, G., "Bboop—a system for 3d keyframe figure animation," In: *Introduction to Computer Animation, Course Notes 7 for SIGGRAPH 83*:240-243 (1983).

Suzuoki et al., "A microprocessor with a 128-bit CPU, ten floating-point MAC's, four floating-point dividers, and an MPEG-2 decoder," *IEEE Journal of Solid-State Circuits* 34(11):1608-1618 (1999).

Terzopoulos et al., "Elastically deformable models," *Computer Graphics* 21(4):205-214 (Jul. 1987).

\* cited by examiner

FIG. 1

Figure 2:
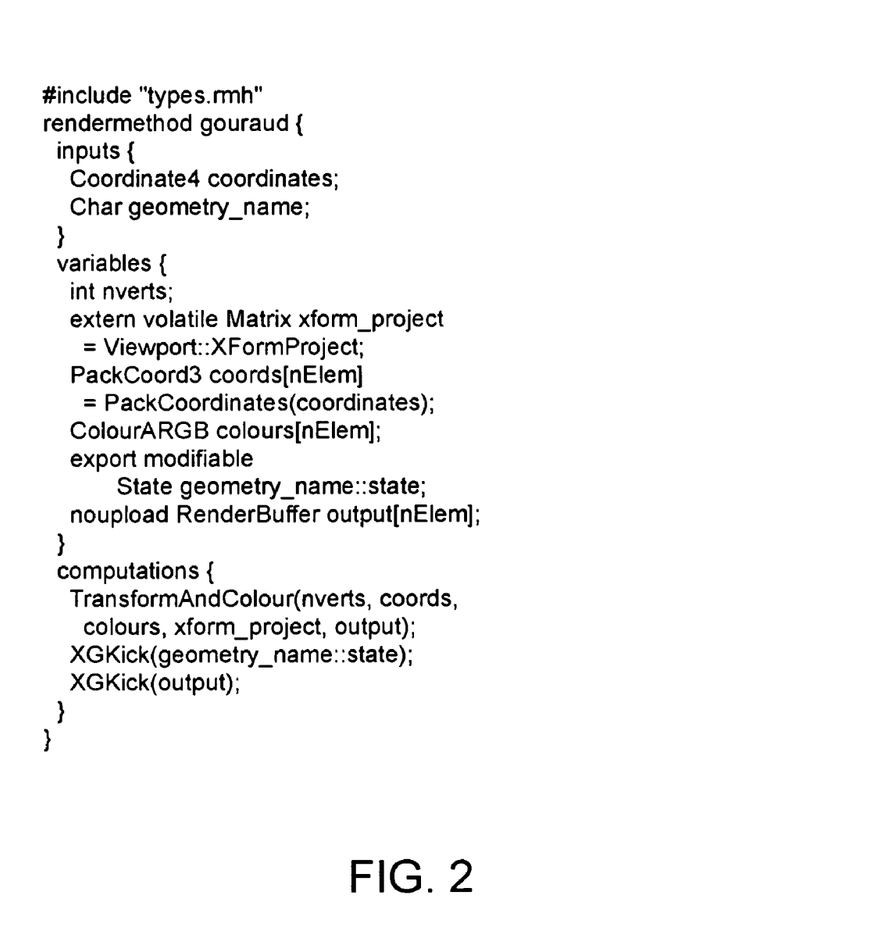
FIG. 2 shows a simple example that implements gouraud shading on the PS2.

The inputs section describes the variables made available to the render method from the art asset. The variables section describes the variables used by the shader. The computations section describes the shader program.

```
#include "types.rmh"
rendermethod gouraud {
  inputs {
    Coordinate4 coordinates;
    Char geometry_name;
  }
  variables {
    int nverts;
    extern volatile Matrix xform_project
      = Viewport::XFormProject;
    PackCoord3 coords[nElem]
      = PackCoordinates(coordinates);
    ColourARGB colours[nElem];
    export modifiable
        State geometry_name::state;
    noupload RenderBuffer output[nElem];
  }
  computations {
    TransformAndColour(nverts, coords,
      colours, xform_project, output);
    XGKick(geometry_name::state);
    XGKick(output);
  }
}
```

FIG. 2

| Platform | Gouraud | Lit | Skinned | Gouraud |
|---|---|---|---|---|
| PS2 | 17.0/22.6 | 10.9/14.7 | 8.5/11.5 | 25.2/31.8 |
| XBox | 47.2/91.4 | 22.4/43.4 | 14.2/30.3 | 63.9/93.8 |
| NGC | 18.7/NA | 10.3/NA | 7.2/NA | NA/NA |
| PC | 24.1/46.1 | 15.9/20.9 | 5.1/10.9 | 26.3/36.2 |

SYSTEMS AND METHODS FOR IMPLEMENTING SHADER-DRIVEN COMPILATION OF RENDERING ASSETS

CROSS-REFERENCES TO RELATED APPLICATIONS

The present application claims the benefit of U.S. Provisional Application Ser. No. 60/363,049, filed Mar. 8, 2002, the contents of which are hereby incorporated in its entirety for all purposes.

BACKGROUND OF THE INVENTION

The present invention relates generally to rendering systems and more particularly to art asset rendering based on shader-driven compilation methods.

In consumer applications such as video games the topology of most graphical elements is fixed, unlike the case of modeling applications, such as Alias|Wavefront Maya™, SoftImage XSI™, and 3D Studio Max™. Hardware designers, both of game consoles and of graphics accelerator chipsets, have exploited this and have designed their hardware to be most efficient at rendering large constant sets of geometry than at rendering individual polygons. This is reflected in the typical APIs used: both Microsoft's DirectX 8 and OpenGL 1.1 and later versions (e.g., OpenGL:1999), for example, support calls for setting up arrays of input data (vertices, colors, and other per-vertex attributes, as well as index lists) that are much more efficient than single-polygon submissions. Further, groups of polygons and other rendering attributes can be collected into display lists for later atomic submission, also at much higher performance than single polygon submissions.

In a consumer application, art asset authoring is part of the development cycle. The assets are pre-processed using some set of tools into a form suitable for both the hardware and the software architecture of the application. The data pre-processes typically manipulate only the geometric elements. Setting other elements of rendering state, such as lighting, vertex and pixel shader selections, rasterization control, transformation matrices, and so forth, as well as the selection of vertex buffers and vertex layouts are handled in the runtime engine. This requires much of the knowledge about the use of the art asset to reside in code, tying the art asset closely to the programmer. Programmers often attempt to generalize this code to deal with multiple assets, at the expense of efficiency. Although shader compilers have been explored as a partial solution to this problem, no one has yet exploited knowledge of the shader to systematically optimize rendering.

Two bodies of work are relevant to the discussion of an art asset compiler. The first is the recent work done on compiling shading languages. The second relates to display lists.

Shading Languages

Shading languages are an outgrowth of Cook's shade trees (Cook, R. L. 1984. "Shade Trees." In *Computer Graphics (Proceedings of SIGGRAPH* 84), vol. 18, 223–231) and Perlin's pixel stream language (Perlin, K. 1985. "An Image Synthesizer." In *Computer Graphics (Proceedings of SIGGRAPH* 85), vol. 19, 287–296). They are now most commonly used in the form of the RenderMan Shading Language (Hanrahan, P. and Lawson, J. 1990. "A Language for Shading and Lighting Calculations." In *Computer Graphics (Proceedings of SIGGRAPH* 90), vol. 24, 289–298. ISBN 0-201-50933-4; Apodaca, A. A. and Mantle, M. W. 1990. "Renderman: Pursuing the Future of Graphics." *IEEE Compter Grahpics & Applications* 10, 4 (July), 44–49). Shading languages have recently been adapted to real-time rendering graphics hardware applications.

Olano and Lastra (Olano, M. and Lastra, A. 1998. "A Shading Language on Graphics Hardware: The Pixelflow Shading System." In *Proceedings of SIGGRAPH* 98, ACM SIGGRAPH/Addison Wesley, Orlando, Fla., Computer Graphics Proceedings, Annual Conference Series, 159–168. ISBN 0-89791-999-8) were first to describe a RenderMan-like language whose compilation is targeted to specific graphics hardware, in their case the PixelFlow system (Molnar, S., Byles, J. and Poulton, J. 1992. "Pixelflow: High-Speed Rendering Using Image Composition." In *Computer Graphics (Proceedings of SIGGRAPH* 92), vol. 26, 231–240. ISBN 0-201-51585-7). PixelFlow is inherently well suited to programmable shading, but is very different from today's consumer level hardware.

id Software's Quake III product incorporates the Quake Shader Language. Here, shader specifications are used to control the OpenGL state machine. The shader language is targeted at specifying multi-pass rendering effects involving the texture units, allowing the coupling of application variables to the parameters of the various passes.

Peercy observed that treating the OpenGL state machine as a SIMD processor yields a framework for compiling the RenderMan Shading Language. They decompose RenderMan shaders into a series of passes of rendering, combined in the frame buffer (Peercy, M. S., Olano, M., Airey, J. and Ungar, P. J. 2000. "Interactive Multi-Pass Programmable Shading." *Proceedings of SIGGRAPH* 2000 (July), 425–432. ISBN 1-58113-208-5).

Recently, Proudfoot (Proudfoot, K., Mark, W. R., Tzvetkov, S. and Hanrahan, P. 2001. "A Real-Time Procedural Shading System for Programmable Graphics Hardware." In *Proceedings of SIGGRAPH* 2001, ACM Press/ACM SIGGRAPH, Computer Graphics Proceedings, Annual Conference Series, 159–170. ISBN 1-58113-292-1), have developed a shader language compiler that uses the programmable vertex shaders available in DirectX 8 and NVIDIA's NV vertex program OpenGL extension (Lindholm, E., Kilgard, M. J. and Moreton, H. 2001. "A User-Programmable Vertex Engine." In *Proceedings of SIGGRAPH* 2001, ACM Press/ACM SIGGRAPH, Computer Graphics Proceedings, Annual Conference Series, 149–158. ISBN 1-58113-292-1), and the per-fragment operations provided by modem texture combiner hardware. By taking into account the multiple levels at which specifications occur (object level, vertex level, or pixel level), they successfully exploit the hardware features at those levels.

In all the above shader compilers geometric data is communicated to the shader through the underlying graphics API, as per the RenderMan model. In RenderMan both the geometry and its bindings to shaders is specified procedurally using the RenderMan Interface Specification. Likewise, Olano and Lastra's, and Proudfoot's systems bind shaders to geometry through the OpenGL API. This requires either an external system to manage the binding of shaders to geometry or else explicit application code per art asset to manage the bindings. These programs are more complex than they might appear at first glance, since they require both runtime code to manage the bindings, as well as synchronized tool code to generate the appropriate data for the runtime.

Display Lists

Art assets are typically produced in 3D modeling and animation packages. These packages are usually directed to interactive manipulation of geometry data and off-line rendering of the resulting objects. They typically have rich feature sets for manipulation of geometry, topology, shading, and animation. However, the raw output models are rarely suited to consumer level hardware. Assets must be authored with sensitivity to their eventual use in real-time consumer-level applications. The assets must be not only converted from the rich description stored by the packages, but also optimized and targeted to the hardware and software architectures of the application. These pre-processing operations range from simple data conversion through to complex re-ordering and optimization tasks.

Hoppe showed how re-ordering the vertices in triangle strips could yield more efficient rendering by exploiting hardware vertex caches (Hoppe, H. 1999. "Optimization of Mesh Locality for Transparent Vertex Caching." *Proceedings of SIGGRAPH* 99 (August), 269–276. ISBN 0-20148-5600-5. Held in Los Angeles, Calif.). Bogomjakov and Gotsman showed how to exploit the vertex cache using vertex meshes instead of triangle strips, without knowing a priori the size of the cache (Bogomjakov, A. and Gotsman, C. 2001. "Universal Rendering Sequences for Transparent Vertex Caching of Progressive Meshes." In *Proceedings of Graphics Interface* 2001, 81–90). Both these approaches can yield two-fold improvements in rendering performance over using the original input data.

No matter the level of geometric optimization, however, some level of optimization of graphics hardware setup and rendering submission is required to obtain the best performance. Early graphics APIs were generally directed to drawing individual polygons (Barrell, K. F. 1983. "The Graphical Kernel System—A Replacement for Core." *First Australasian Conference on Computer Graphics*, 22–26). The first versions of OpenGL were similarly limited, leading to high function call overhead on polygon submissions. The GLArrays mechanism, presented in OpenGL 1.1, removed much of this overhead by allowing bulk specification of polygons. (see, e.g., OpenGL Architecture Review Board, Woo, M., Neider, J., Davis, T. and Shreiner, D. 1999. *OpenGL Programming Guide: The Official Guide to Learning OpenGL, Version* 1.2. Addison-Wesley) DirectX 8's vertex streams operate on the same principle. (see, e.g., Microsoft, 2000. *DirectX 8 Programmer's Reference.* Microsoft Press)

Although vertex arrays speed submission of geometry data, the various state setting functions in OpenGL and DirectX 8 still require considerable overhead. Both support display lists, used to collect both geometry and state setting calls for later atomic re-submission. Although these display lists have the potential for considerable optimization at the driver level, their construction at runtime, with the ensuing performance limitations, limits the degree to which display list optimization can be taken. In particular, parameterized display lists are problematic. Although a single display list cannot be parameterized, a display list may call one or more display lists which may have been re-built since the original display list, allowing simple parameterization. This architecture does not, however, allow the driver to optimize state changes across such a nested display list call, as the newly defined list may affect any of the state that had been set in the parent display list.

It is therefore desirable to provide novel systems and methods that optimize art asset rendering operations without the drawbacks associated with the above methodologies.

BRIEF SUMMARY OF THE INVENTION

The present invention provides systems and methods that optimize art asset rendering operations by using shader-driven compilation techniques.

Rendering performance of consumer graphics hardware benefits from pre-processing geometric data into a form targeted to the underlying API and hardware. The various elements of geometric data are then coupled with a shading program at runtime to draw the asset.

According to the present invention, systems and methods are provided in which pre-processing is performed in a compilation process in which geometric data are processed with knowledge of associated shading programs. The data are converted into data structures targeted directly to the target hardware platform, and a code stream is assembled that describes the manipulations required to render these data structures. The compiler of the present invention includes a front end configured to read the geometric data and attributes (hereafter referred to as an art asset) output from a 3D modeling package and shaders in a platform independent form and perform platform-independent optimizations, and a back end configured to perform platform-specific optimizations and generate platform-targeted data structures and code streams.

Advantageously, the compiler back-end can be targeted to various platforms, and has been targeted to four platforms, three of which are radically different from one another. On all platforms the rendering performance of the compiled assets, used in real situations, is well above that of hand-coded assets.

The most recent generations of consumer level graphics hardware, found in such consumer devices as the Sony PlayStation2™, Microsoft XBOX™, and Nintendo GameCube™, as well as in personal computers, have brought high end real-time graphics to the consumer at large. This hardware exists principally for use in video games, and this is reflected in the hardware architectures.

The systems of the present invention addresses the following requirements:

to efficiently render fixed topology objects with fixed shading effects;
   to support runtime modifications to the objects drawn, but not necessarily modification of their topologies;
   to exploit hardware capabilities such as vertex programs, and pixel combiners; and
   to allow for user code and art assets to be portable across different hardware platforms.

The present invention provides a real-time rendering system comprised of a small, efficient runtime engine with a portable API, and a modular retargetable art asset compiler. The runtime engine is implemented both on top of existing graphics APIs and at the driver level. An art asset is authored in some geometric modeling package, such as Alias|Wavefront Maya, 3D Studio Max, or SoftImage XSI. The asset preferably includes the geometry, the per-vertex attributes, and a collection of materials (surface properties, colors, texture map usages, etc.) and textures for the asset. The asset description is sufficiently rich that the object can be rendered as it should appear on final use without programmer intervention.

In one aspect, the architecture is based on separating the rendering primitive description from the runtime using a shader language that describes not only the shader program, but the semantics of the input data to the shader. These augmented shaders are called render methods and a single art asset may reference many. Conversely a render method may be used by more than one art asset.

In one embodiment of the present invention, the binding of geometry to the shader is explicitly managed in the art asset compiler. This provides many benefits. For example, user code specific to a particular asset is only required if there are explicit exposed runtime shader parameters. Additionally, as a corollary to the above, an artist can quickly iterate an art asset on the target platform without programmer intervention. Moreover, the runtime API is dramatically simplified, since all geometry specification and binding is preferably performed off line.

In one embodiment, rendering objects are constructed off-line, and parameterization of these objects is addressed through runtime linkage of external variables to the rendering objects and by exporting various parts of the objects to the runtime for modification. These methods allow aggressive optimization around parameterized elements of the models of the present invention.

The resulting system is fast and flexible. It has shown itself to be as fast or faster than existing custom rendering engines. Porting the system of the present invention to a new platform is significantly faster than porting a custom game engine and tool suite to new hardware.

According to an aspect of the invention, a method is provided for generating optimized code for rendering an art asset at runtime in a computer. The method typically includes providing an art asset and one or more render methods associated with the art asset to a front end of a compiler, and generating one or more packets in the front end of the compiler, each packet representing a fragment of the art asset and an individual call to one of the one or more render methods the method also typically includes generating optimized code and data streams in a back end of the compiler using the one or more packets, wherein the optimized code and data streams are used to render the art asset on a display at runtime.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 3*a,* 3*b* and 3*c* illustrate performance figures of a system of the present invention, in millions of polygons per second and vertex indices submitted per second; FIG. 3*a* summarizes some typical performance numbers achieved by a system according to the present invention.

DETAILED DESCRIPTION OF THE INVENTION

Figure 1:
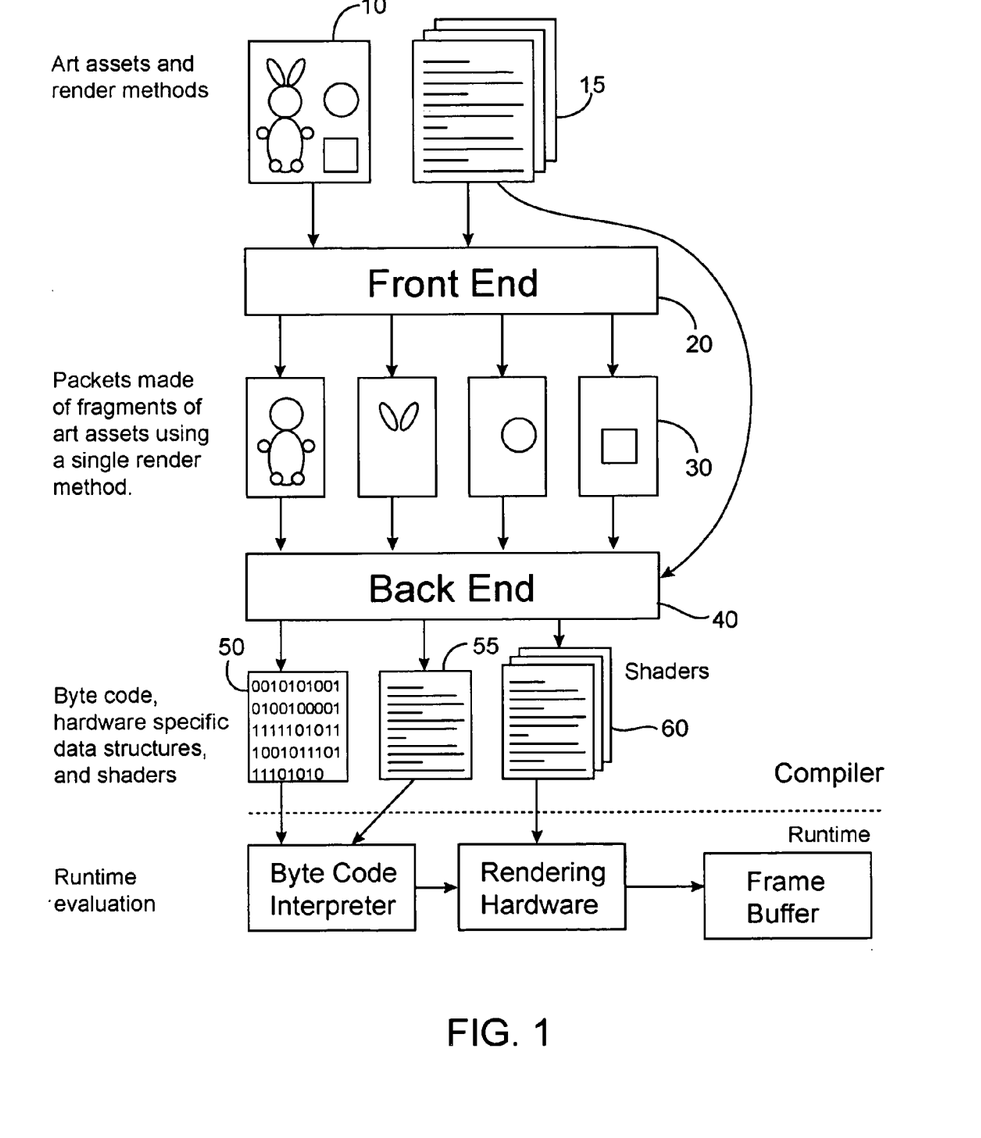
FIG. 1 illustrates an embodiment of a system including a compiler according to an embodiment of the present invention.

One embodiment of a system of the present invention is illustrated in FIG. 1. As shown, an art asset 10 and an extension of shader specifications, called the render methods, 15 which include a declaration of shader input variables and off-line computations to generate these variables from the art asset, are provided to the front end 20 of an art asset compiler. The compiler front end 20 takes as input the art asset 10 and render methods 15, e.g., polygonal geometric data and model attributes, and produces segmented, geometrically optimized asset fragments, called packets, 30 representing individual calls to the render methods. It should be appreciated that alternative front ends can be constructed to address non-polygonal data, such as spline surfaces or particle systems using the teachings of the present invention. A back end 40 of the asset compiler takes packets 30 generated by the front end, and generates optimized code and data streams 50, hardware specific data structures 55 and shaders 60 used to render the asset at runtime.

In one embodiment of the present invention, the binding of geometry to the shader is explicitly managed in the art asset compiler. This provides many benefits. For example, user code specific to a particular asset is only required if there are explicit exposed runtime shader parameters (see, e.g., variables section below). Additionally, as a corollary to the above, an artist can quickly iterate an art asset on the target platform without programmer intervention. Moreover, the runtime API is dramatically simplified, since all geometry specification and binding is preferably performed off line (tools are provided for generating bindings at runtime, but this use is generally discouraged as such dynamic models are considerably less efficient than the compiled models (see, e.g., API section below)).

In one embodiment, rendering objects are constructed off-line, and parameterization of these objects is addressed through runtime linkage of external variables to the rendering objects and by exporting various parts of the objects to the runtime for modification (see, e.g., variables section below). These methods allow aggressive optimization around parameterized elements of the models of the present invention.

Runtime Environment

Figure 6:
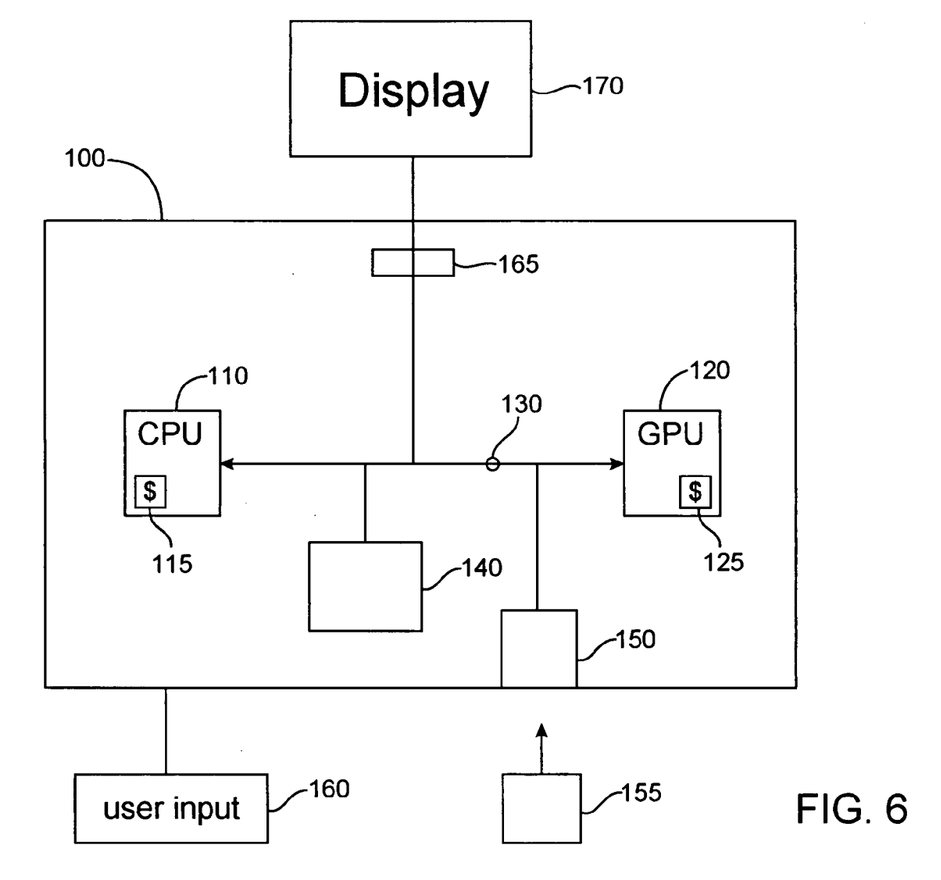
FIG. 6 illustrates a typical hardware platform for which the present invention is useful.

To make the discussion of the art asset compiler concrete a brief description of targeted runtime environments follows. FIG. 6 illustrates typical components of a hardware platform 100 for which the present invention is useful. As shown, platform 100 includes a CPU 110 coupled to a GPU 120 over a system bus 130. Each of CPU 110 and GPU 120 typically include a local on-chip memory, e.g., CPU RAM cache 115 and GPU RAM cache 125. Platform 100 also typically includes a memory unit 140, such as a hard drive or other memory, and a media device 150 configured to receive one or more of various media 155 such as CD, DVD and floppy disk media as are well known. One or more user input devices 160 can be coupled to platform 100. Examples of user interface devices include a keyboard, joystick, mouse, etc. Platform 100 and its various components typically operate to generate or render images for display on display device 170, such as a monitor, television screen, LCD display, etc. A display driver 165 is typically provided for communicating with display 170.

The Influence of the Hardware Environment

The target environment for the compiler includes a particular hardware rendering platform, together with a runtime library on that platform. The runtime library and compiler of the present invention are implementable on many platforms, including, for example, Sony PlayStation2™ (PS2), Microsoft XBOX™, Nintendo GameCube™ (NGC), and DirectX 8 PC platforms. Although these architectures differ substantially (see, e.g., Suzuoki, M., Kutaragi, K., Hiroi, T., Magoshi, H., Okamoto, S., Oka, M., Ohba, A., Yamamoto, Y., Furuhashi, M., Tanaka, M., Yutaka, T., Okada, T., Nagamatsu, M., Urakawa, Y., Funyu, M., Kunimatsu, A., Goto, H., Hashimoto, K., Ide, N., Murakami, H., Ohtaguro, Y. and Aono, A. 1999. "A Microprocessor with a 128-Bit CPU, Ten Floating-Point Mac's, Four Floating-Point Dividers, and an MPEG-2 Decoder." In *IEEE Journal of Solid-State Circuits: Special Issue on the 1999 ISSCC: Digital, Memory and Signal Processing*. IEEE Solid-State Circuits Society, 1608; Lindholm, E., Kilgard, M. J. and Moreton, H. 2001. "A User-Programmable Vertex Engine." In *Proceedings of SIGGRAPH 2001*, ACM Press/ACM SIGGRAPH, Computer Graphics Proceedings, Annual Conference Series, 149–158. ISBN 1-58113-292-1), they share some fundamental characteristics, including:

- The CPU and GPU are separate processors that are connected by a relatively narrow bus. (Note that even with it's Unified Memory Architecture, the XBOX still has limited bus bandwidth to the GPU.)
- The GPU is user programmable. (This is not strictly true in the case of the Nintendo GameCube, but a rich set of predefined computational elements is available.)
- The platforms have varying levels of texture combining support, but all texture combining occurs as a post GPU stage with no feedback to the GPU or CPU. (Such feedback is possible, and can be exploited by the shaders of the present invention on some platforms, but should be managed externally from the art asset compilation process.)

Keeping these characteristics in mind, it is desirable to avoid CPU operations of the form read/compute/write/submit-to-GPU which require at least 3 times the bus traffic of a submission of static vertices to the GPU. Therefore, in one embodiment, the present invention privileges geometries with static vertex data and topologies. The present invention also supports animation, for example, many deformations can be applied in the GPU and pixel combiners without requiring the CPU to modify the input data. In particular, the present invention fully supports hierarchical coordinate frame animation (see, e.g., Stern, G. 1983. "Bbop—A System for 3D Keyframe Figure Animation." In *Introduction to Computer Animation, Course Notes 7 for SIGGRAPH 83*, 240–243.) with an arbitrary number of coordinate frames, including weighted skinning (see, e.g., Terzopoulos, D., Platt, J., Barr, A. and Fleischer, K. 1987. "Elastically Deformable Models." In *Computer Graphics (Proceedings of SIGGRAPH 87)*, vol. 21, 205–214; Lander, J. 1998. "Skin Them Bones: Game Programming for the Web Generation." *Game Developer Magazine*, 11–16).

The Runtime API

The runtime environment of the present invention presents an API, for example, a small C++ API, to the user, for drawing models as primitive objects. A model is a collection of geometric primitives (e.g., triangles, b-splines, points, etc.) and state objects (rendering states, textures, etc.) bound to the shaders required to draw them with predetermined effects. A model is segmented into geometries, each of which can be independently turned on or off. Geometries and models map directly to art assets input to the compiler. Each run of the art asset compiler generates a single model, containing one or more geometries. Models may expose a set of control variables to the user (see variables section below). Drawing a model is done by setting the required control variables and calling the model's \verb+Draw+ method. It is only necessary to set the control variables when their value changes as the system retains their values. This is a mechanism used to control animations as well as other dynamic rendering effects.

The API preferably does not expose polygon rendering calls. The user can construct models procedurally using an API similar to the OpenGL GLArray construction. These are referred to as dynamic models, and have worse rendering performance than the compiled models of the present invention.

Apart from model rendering, the present invention also manages house-keeping operations such as setting up the hardware for rendering. The present invention also provides utility functions to manipulate hardware state objects and textures. Note that these objects reside in the compiled models, but may be exposed to the user. The present invention also provides an optional viewport and camera abstraction as a convenience to the user. Further, the present invention provides an animation engine that interfaces with models via their exposed control variables.

Render Methods

A render method includes a specification of a set of variables and a shader program that uses these variables. Render methods are designed to be sufficiently abstract that the same render method can be used over a wide range of art assets. Conversely, some render methods are written to address a problem present in a specific art asset. The compiler architecture of the present invention allows one to apply the render method to any art asset that has the data necessary to satisfy the shader input variables.

FIG. 2 shows a simple example that implements gouraud shading on the PS2 platform.

Types

Because render methods are used to bind arbitrary geometric data directly to shaders, variables in both the inputs and variables sections are typed. This assures that data presented to the shader are in the form required. Types are user extensible and given in the render method specification. Type definitions are platform specific, and include such properties as the size of object in CPU memory, the size in GPU memory, hardware states required to transfer the type from CPU to GPU, and so on. The information about a type allows the compiler to manipulate the elements of the art asset without assumptions about them. The present invention, in one embodiment, provides an identical set of base types for all platforms.

Inputs

The inputs section declares the types of the data elements required by the render method. These are called input variables. In this example, the coordinates input variable is declared with type Coordinate4. This variable can then be referenced, for example, in a converter or other data manipulation program executed to construct data images for the variables section. The input declaration can be accompanied by an explicit value to assign to the variable, which is used if the art asset does not provide such an input. Input data from the art asset are bound by name to each such input variable. The variables provided by the compiler include vertex and material data from the art asset, as well as arbitrary data the user may have tagged on vertices and materials. This allows easy extension of the compiler's functionality through simple naming conventions binding the user data to the render method inputs.

Variables

The variables section declares the data that are available to the computations. Variables are tagged with a particular type and a number of elements as an array specification. In the absence of an array specification a length of one is assumed. The special array length nElem is useful for a simple constraint system to maximize the number of elements within the constraints of the hardware.

All variables (except for those tagged as temporaries by the noupload keyword) have values derived from the inputs declared in the input section. When an explicit converter is specified using the=Converter(params, . . . ) syntax, the converter function (dynamically loaded from a user-extensible library) is executed with the given parameters. The parameters are themselves either the result of a conversion function, or an input variable. In the absence of an explicit converter specification, the identity converter is assumed. The converter mechanism allows simple compile-time manipulations of the data elements. Typical uses include, for example, data packing operations, as well as various re-indexing tasks, and various pre-processing operations such as binormal vector generation or color balancing. Since shaders are tightly coupled to art assets through the compiler of the present invention, as much shader-specific pre-processing is preferably moved into these converters as possible, making the art conversion process as uniform as possible for differing assets and shaders.

Not all variables used by a shader can be made available through a compiler pre-process, however. For example, data such as transformation matrices are not available at compile time. They could be communicated as implicit variables. This would restrict the user from extending the set of such variables. According to one aspect, the render method specification is extended through external linkage. By adding the extern keyword to a variable declaration along with an assignment of the form=variable_name, a reference is made to an external variable named variable_name. In one example in FIG. 2, the runtime is responsible for replacing unresolved references to the variable named Viewport::XFormProject with a pointer to the actual runtime address of this variable. This external reference is resolved when the asset is loaded. Assets are preferably stored in ELF format (e.g., Tool Interface Standards, 1998, ELF: Executable and linkable format. ftp://ftp.intel.com/pub/tis), and provide the external linkage through an ELF dynamic loader. The library registers a number of variables with the dynamic loader, making transformation matrices, for example, available to render methods. The user may also, at runtime, register his own variables.

Because the GPU 120 and CPU 110 may operate in parallel, changes to an externally linked variable on the CPU may lead to race conditions. To eliminate the race condition without introducing undue locking restrictions it is desirable to copy the data elements that might produce such a race. It is undesirable, however, to copy all such variable data because of the overhead required. Instead, in one aspect of the present invention, the elements that might induce such a race with the volatile keyword are flagged. The user may omit the keyword, causing use by reference rather than copy, and more efficient execution. Omitting the volatile keyword on externally linked variables is generally risky, there being no control over allowed modification of such variables.

Another important aspect of the variables is that they are, in general, opaque to the runtime. It is not possible to examine or set values inside the compiled art assets, since the compiler may have re-ordered, simplified, or otherwise hidden the data elements. Although this restriction leads to greater rendering efficiency, may not be sufficiently flexible. There is frequently need to examine, on the CPU rather than in the render method, data stored in a model. In many cases it is useful to export control variables, that unlike external variables, reside with and in the art asset. In this case, the user does not need to construct, register, and manage these variables at runtime.

Variables are declared exported in the render method by prefixing the declaration with the keyword export. As the compiler emits data that is marked as exported, it adds a reference, e.g., an ELF symbol reference, to the variable, along with its name, to a dictionary associated with each model. At runtime the user can query the models dictionary to find the address of a particular variable. In general this is an iteration over a number of variables with the same name. If a variable shares the same name and binary image, only one version of that variable is added to the dictionary. If the binary images differ but the names are the same, both are added, with the same name. Since these names occur in each packet compiled with the same render method, some system is required to differentiate them.

To allow the user to distinguish between these variables, a name extension mechanism is provided. String variables are preferably referred to in the variable name to extend the variable name at compile time. For example, in FIG. 2 the state variable is extended with the contents of the string variable geometry_name. These string variables are communicated using the same mechanism as any other inputs, and so can be generated by the compiler front end, or be strings of user data attached to the material or the input model. This name extension mechanism can be used to implement a scoping system for variables. The compiler front end provides scoping at the level of the Model, Geometry and packet. The user can easily manage additional levels of scoping by tagging their art asset in the original authoring package.

Although the exported variables dictionary returns a pointer to the exported variable, costs are associated with allowing modification of compiled data. For example, on PC class architectures, vertex data is duplicated into memory that cannot be efficiently accessed from the CPU, but is very fast for the GPU. Therefore modifications to this data by the CPU require the data to be copied again. To avoid or reduce such performance costs, the present invention in one embodiment requires a formal declaration of which elements are to be modifiable at runtime, using the modifiable keyword, and prohibiting modification of data not so flagged. The dictionary maintains a flag indicating the modifiable status of a variable, and enforces the restriction on modification, for example, using the C++ const mechanism. The use of a modifiable flag is orthogonal to the volatile flag. This is useful since it allows use by reference of exported modifiable data when this is appropriate (infrequent changes to large data structures), while still allowing use by copy when necessary (re-use of a model in the same frame with differing parameter settings, frequent changes). This modification mechanism advantageously provides functionality equivalent to parameterized display lists, constructed off-line in the compiler, and suitably optimized.

According to one aspect, a simple extension made possible by the exported variables dictionary is a runtime GUI tool to remotely view and modify the exported variables associated with a model. This allows an artist or programmer to tweak the appearance and behavior of the model without recompiling the art asset. The compiler can in turn take the saved data from this tool as input to a later compilation of the same art asset, or other art assets with similar layout.

Computations

Rather than introduce a new shader language, in one aspect the present invention uses the native shading languages on each target platform, plus a macro expansion system to connect the variables to the shader program. To make it easier to write render methods, complex shaders are broken into reusable parameterized macros. The macros are defined in external files and are catenated and assembled into machine specific shader programs. A parameter passing convention binds the variables and relevant type information to the parameters of the macros. This lets the user quickly prototype new effects using existing program fragments. However, highly optimized shaders require hand crafted shader programs. Shader compilers, such as those of Proudfoot et al. or Peercy et al. could be adopted into this architecture at this level.

Compiler Front End

Referring back to FIG. 1, the front end 20 of the asset compiler takes an art asset 10 and render methods 15 and constructs a series of packets 30 required to render the art asset. In one aspect the, front end 20 of the present example deals exclusively with art assets that are composed of polygons, although other front ends can be created using the teachings of the present invention to deal with other kinds of data such as, for example, spline surfaces, particle systems, custom terrain meshes, and custom city rendering systems.

The compiler front end 20 breaks the art asset 10 into geometries, which have been defined by the artist. Within each geometry the polygons are preferably collected and classified by material and vertex properties.

Materials are intrinsic to the asset editing package(s) used and can contain arbitrary user defined data, as well as standard predefined material properties. In one aspect, the front end is also responsible for identifying materials that are in fact identical and merging them.

A vertex includes properties such as a coordinate, texture coordinate, normal, and others as are well known, but can also include arbitrary user defined data.

After grouping polygons into classes, the compiler then selects a render method to associate with each class. Each class includes a set of material properties each with a name, a collection of vertices including a set of named data elements, and a collection of polygons composed from the vertices. In one embodiment, a render method is selected by iterating over a list of available render methods until one is found whose undefined inputs can be satisfied by the available data in the class. To provide finer control the material can also be tagged with a requested render method. If the requested render method's undefined inputs cannot be satisfied by the available data, then the default mechanism is applied and a warning is issued.

Once a class has been associated with a render method, the compiler preferably constructs one or more packets from the data in the class. In certain aspects, cutting the data into smaller packets is based on hardware restrictions that may limit the number data elements that can be transferred to the GPU. For example, on some platforms this is a hard limit based on the size of GPU memory, on others it is an experimentally determined point of best efficiency. Some platforms differentiate between streams of data and constant elements. This is reflected in the segmentation computation. Once constructed the packets are passed to the packet compiler layer.

The process of partitioning the data in the class into packets includes performing triangle stripping or mesh reordering (e.g., Hoppe, H. 1999. "Optimization of Mesh Locality for Transparent Vertex Caching." *Proceedings of SIGGRAPH* 99, (August) 269–276. ISBN 0-20148-5600-5. Held in Los Angeles, Calif.) for efficient rendering of the underlying polygons, and may require the cloning of vertex data that must appear in more than one packet.

One step in the packetization process of the present invention is the association of multiple coordinate frames with the vertices. The character animation system allows for each vertex to be attached to one of a large set of coordinate frames. These coordinate frames are in turn constructed out of a linear combination of a smaller set of coordinate frames that represent an animation skeleton. Because of memory limitations on the GPU the number of unique coordinate frames that appear in each packet is preferably limited. This set of coordinate frames is referred to as the matrix palette. This transforms the mesh optimization step into a multi dimensional optimization problem: simultaneously minimize the number of vertex transforms required on the hardware, and the number of matrix palettes induced. Often a strip cannot be extended with a particular triangle because this would cause the matrix palette required for the packet to exceed the maximum palette size.

Packet Compiler

Emitting a list of packets that are interpreted at runtime may lead to poor runtime performance. There are two approaches to optimizing such a scheme. One approach is to optimize the runtime environment, implementing such strategies as minimizing modification of hardware state, re-ordering rendering by texture usage, caching computation results for reuse and so on. However, many of these optimizations can be performed off-line because the data to be rendered is known ahead of time.

The packet compiler is responsible for transforming the packets generated by the front end into data and associated code that can be executed to render the art asset without any external intervention by a programmer. The code generated by the packet compiler is an optimized program tailored to render exactly the input art asset. Note that the packet compiler uses no information about the topology. Hence, it can be used to compile arbitrary data sets, not just polygonal data sets.

The form of the output may be radically different across different platforms. Despite these differences, there is a common structure in the back end of the compiler. For example, the back end always generates a model object which contains the following: a pointer to a byte code stream that must be executed to render the model; a dictionary pointing to the data exported from the render methods used in the packets representing the model; and external references to imported data that will be resolved to pointers at load time. These might occur in the byte code, or in other hardware specific data structures. Additionally, the byte code contains references to the hardware specific data structures that contain the information required for rendering.

For each platform, hardware specific optimizations for rendering speed are performed on the byte code and data structures generated. These optimizations largely rely on the knowledge that the rendering of a model can be treated as an atomic operation and the state of the hardware is therefore fully controlled between each packet submitted to the hardware in the rendering of the model.

In one embodiment, the back end is configured to operate in several passes as follows.

Pass 1: Packet ordering.
Pass 2: Variable data construction.
Pass 3: Export data accumulation.

Pass 6: Data structure generation.
Pass 5: Code generation.
Pass 6: Global optimizations of data structures and code.
Pass 7: Code and data emission.

Pass 1—Packet Ordering

To use the underlying hardware efficiently, packets are reordered to minimize expensive changes in the hardware state. Reordering is restricted to allow the user to retain control of rendering order. In particular, it is guaranteed that the geometries of a model will be rendered in the order they appear in the art asset. In one embodiment, a simple heuristic is implemented to minimize expensive state changes. Packets are grouped first by geometry, then by render method, then by textures, and finally by matrix palette. In one aspect, a more sophisticated compiler, for example, can examine the generated code stream and model the cost of its operations to determine the best possible data ordering.

Pass 2—Variable Data Construction

The front end provides the back end with a list of packets, each of which has an associated render method and set of input data. The input data is not what is ultimately fed to the shader, and therefore it must be converted into the data defined in the variables section of the render method associated with the packet. This is accomplished by executing the converter functions specified by the render method. The result is an instantiated packet. In an instantiated packet, the data for every variable is either known, or an external symbolic reference is known that will resolve to the memory location of that data at run time. Reference is made to variables that have fully known data contents as hard data. Variables that are only defined by extern declarations (imported data) are called soft data. At this stage, the compiler also assigns symbolic names to every variables data. These symbolic names are used to refer to the memory location containing the data, and are used in the remaining passes whenever a direct reference to the data must be generated. In the case of soft data the symbolic name is the name defined by the extern declaration in the render method.

In one aspect, although symbolic names are assigned to each block of data at this point, the data itself is neither emitted nor placed into specific data structures. This is preferably performed in later passes.

Pass 3—Export Data Accumulation

This pass accumulates the dictionary data structure associated with the model that can be used at runtime to find exported variables. The symbolic names assigned to data in the prior pass are used here to fill in pointers in the resulting dictionary.

Pass 4—Data Structure Generation

In this pass the rendering data structure is created that holds the hard and soft data referred to by the instantiated packets. On many of the target platforms, it is desirable to feed the underlying rendering hardware as directly as possible. This advantageously allows for device driver overhead and unnecessary manipulation of the data to be avoided. This is accomplished by building the data structures in as near native form as possible.

For example, on the PS2 platform, a chained direct memory access (DMA) unit feeds data to the GPU in parallel with CPU operations. The DMA unit supports a nested CALL structure, much like a procedure call. This allows to pre-build large fragments of the DMA chain with the rendering data embedded in the DMA chain. One advantage of this is that the CPU need not ever touch the data in these pre-assembled DMA fragments, only chain together CALL operations to the DMA fragments at render time. Another advantage is that memory overhead required for model submission is lowered, because extra copies of the data are not required.

On the Gamecube platform, a similar data structure is constructed that feeds the hardware directly. On the XBOX and PC platforms, vertex buffers and hardware command streams are pre-assembled.

Pass 5—Code Generation

In the code generation pass, a byte code program is generated for each instantiated packet that performs the set of CPU operations required to render the data contained in the packet. In the next pass, the byte code programs are catenated and global optimizations are performed over the resulting program.

A byte code is preferably used to express these programs, rather than native assembly instructions. The overhead in interpreting the byte code is minimal, and is offset by the fact that the byte code interpreter fits into the instruction cache on the CPU. On some hardware the byte code interpretation is faster than executing a stream of in-line machine instructions. This is due to a reduction in instruction cache misses and procedure calls. Furthermore, byte code has two major advantages. First, programs in the byte code are very compact. Second, because the instruction set of the byte code of the present invention is very small (e.g., 10 to 20 instructions, depending on the platform), it is easy to write an optimizer for the byte code.

The instruction set for a platform depends on the underlying hardware. For example, on the PS2 platform a single DMA chain is submitted to the hardware encoding the rendering for an entire scene. The byte code instructions on this hardware perform simple operations geared toward assembling this DMA chain, as well as some more CPU intensive operations that generate data that is needed in the DMA chain. Examples of the former operations include placing a call to a fixed chunk of DMA data into the chain, and copying volatile data directly into the chain. Examples of the later include uploading a new vertex shader program to the hardware, and computing matrix palette sets for an animated object from animation data. On platforms that have more of an API between the compiler and the hardware, the byte code closely corresponds to the calls to the underlying rendering API, for example, setting of vertex streams, state setting calls, and rendering submission instructions.

Pass 6—Global Optimizations

The specific optimizations performed in this pass are dependent upon the nature of the target platform. These optimizations are classified into two classes: data transfer optimizations and redundant code removal.

In performing data transfer optimizations, it is desirable to remove redundant transfers of data to the GPU. This is really a special case of redundant code removal. This is done in one embodiment by simulating the contents of the GPU memory over the execution of the rendering of a model, and noting uploads that do not change the memory image. For example, this optimization step removes the redundant setting of the transformation matrix from one packet to the next.

Because GPU execution is not simulated in detail, only the uploading of data to the GPU, hints to tell when the GPU will modify the contents of a memory location are provided, forcing upload into that location. Two keywords to tag a render method variable as hints to the optimizer include: noupload and transient. The noupload keyword indicates that a variable is a temporary variable to be used by the GPU as needed. The transient keyword indicates a variable that must be set before the shader program is run, but that will be modified by the execution of the shader program.

Along with data upload optimization, similar optimizations of machine register setting instructions and byte code instructions are desirable. For example, noted on the PS2 platform are successive packets that occur with only a CALL instruction in their byte code and merge the DMA chains for the packets together. This can result in very large models that are submitted with only a few byte code instructions.

As another example, on the PS2 platform the data transfer mechanism is itself a state machine that must be appropriately set to decode the data as it is fed to the GPU. In this case the data transfer hardware is simulated to find the minimal set of register changes required to set the data transfer hardware into the desired state. This can account for as much as a 20% reduction of the rendering time on the PS2.

Many other specific optimizations are used on the various platforms supported as will be apparent to one skilled in the art.

Figure 3A:
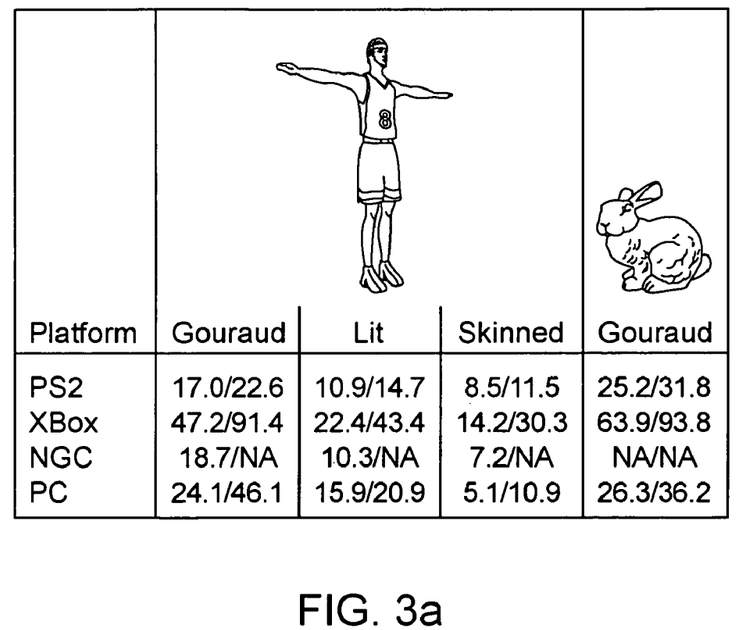
Figure 3B:
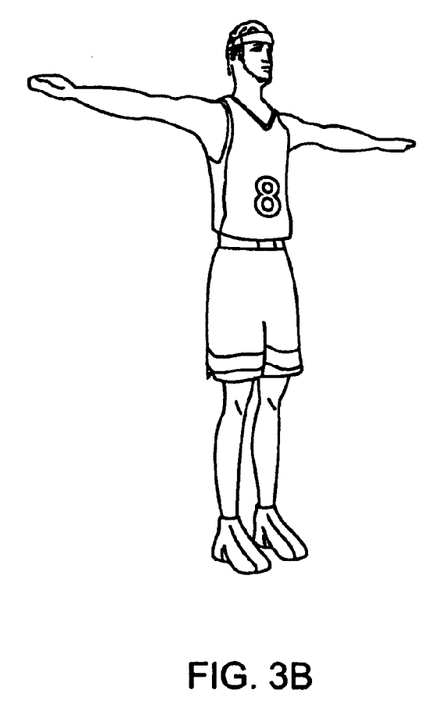
Figure 3C:
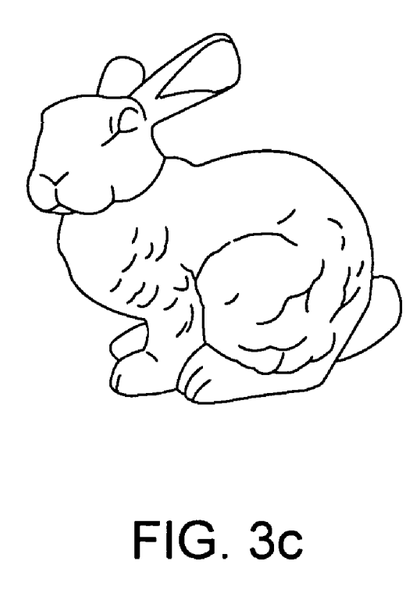

FIGS. 3a, 3b and 3c illustrate performance figures of a system of the present invention, in millions of polygons per second and vertex indices submitted per second. The player is a 3998 polygon model, drawn without texture or lighting, with textures and lighting, and skinned with textures and lighting. The bunny model includes 69451 polygons. (Bunny model courtesy of the Stanford Computer Graphics Laboratory. The PC is a 1.4 Ghz AMD Athlon with an ATI Radeon 8500 graphics accelerator.)

Figure 4:
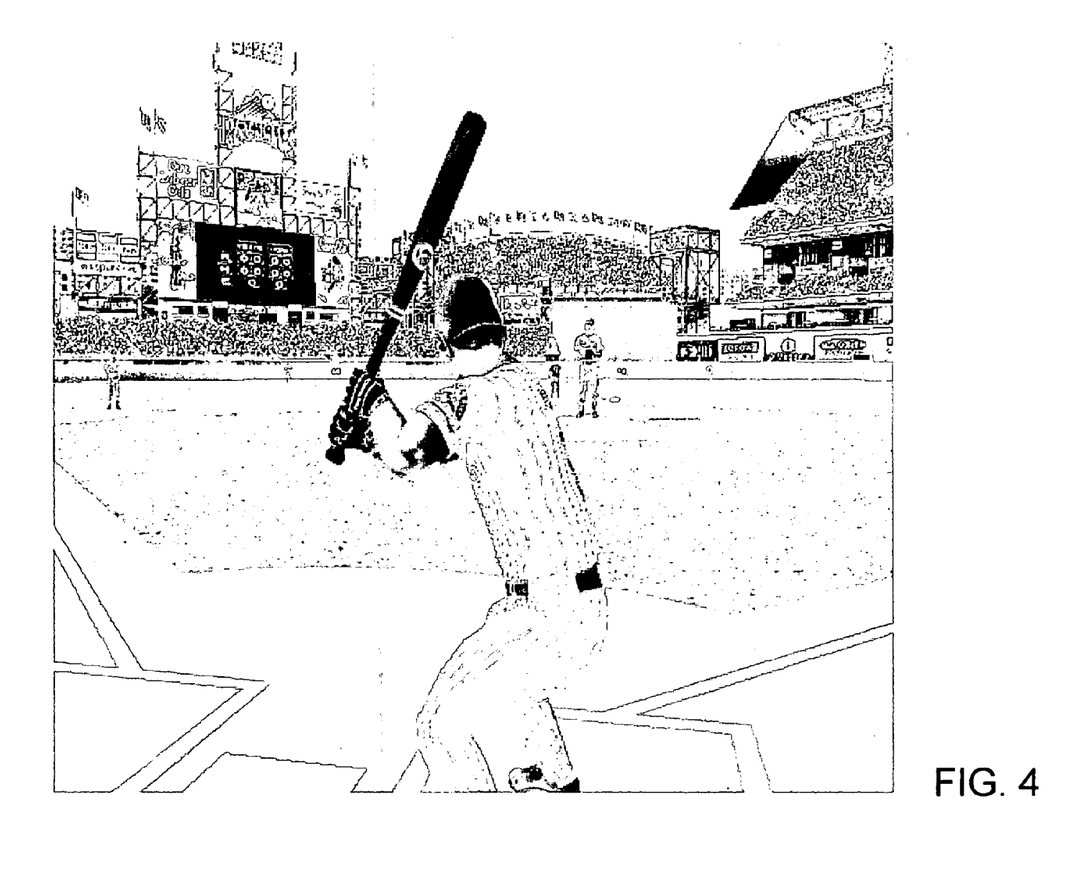
FIG. 4 illustrates a screen capture of a PS2 application using a system according to the present invention, demonstrating skinning for the characters, a lit stadium, and a custom crowd renderer, all implemented as render methods.

FIG. 4 illustrates a screen capture of a PS2 application using a system according to the present invention, demonstrating skinning for the characters, a lit stadium, and a custom crowd renderer, all implemented as render methods.

Figure 5:
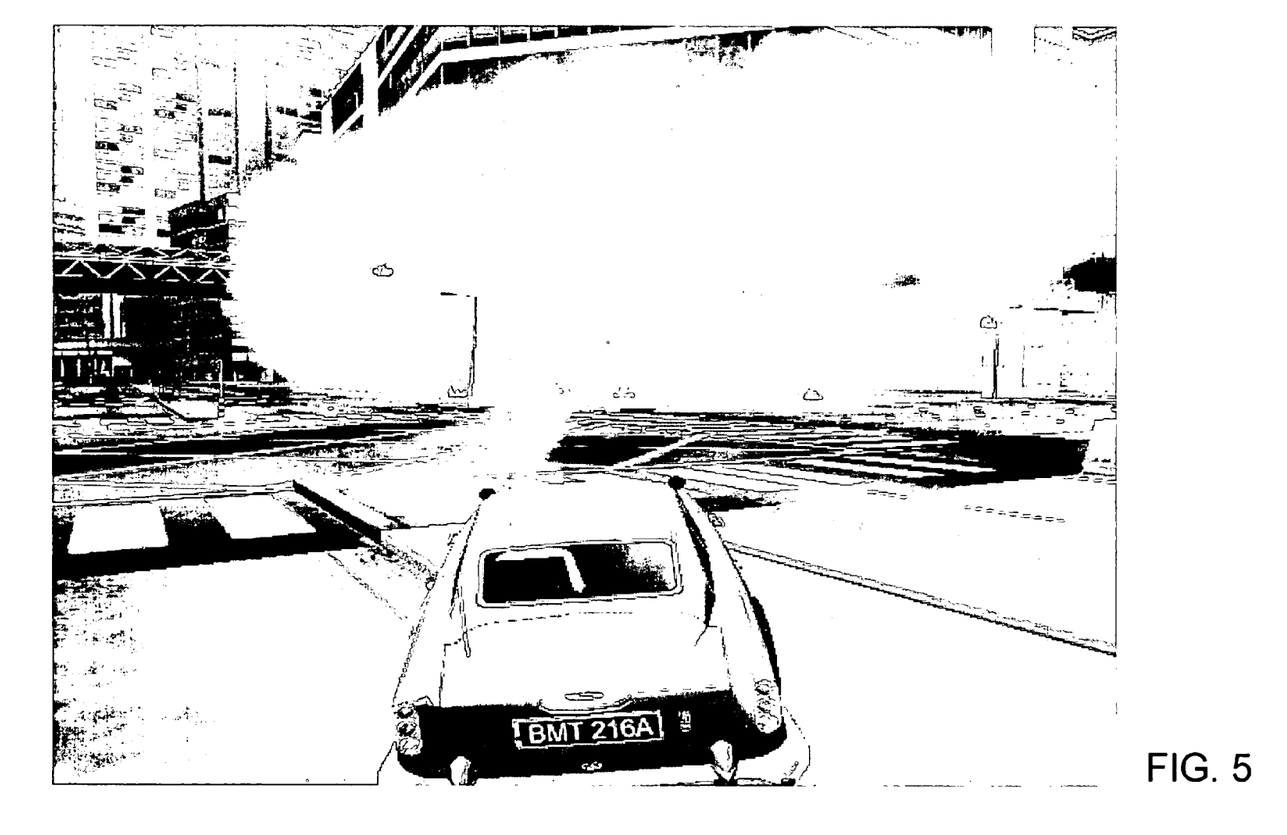
FIG. 5 illustrates another scene using a system according to the present invention, showing a cityscape generated by an alternative compiler front end, and a particle system.

FIG. 5 illustrates another scene using a system according to the present invention, showing a cityscape generated by a user-developed alternative compiler front end, and a particle system.

FIG. 3a summarizes some typical performance numbers achieved by a system according to the present invention. These figures are sustainable throughput rates for production art assets. For the sake of comparison, figures for the Stanford Bunny model are also included. The CPU is largely idle in these examples, as would be required to allow for an interactive applications use of the CPU. The bottle necks on these systems are generally in the bus to the GPU, and the transformation and rasterization engines. In some cases, better performance numbers can be achieved by intensive use of the CPU, but this would not represent the use case required. The performance achieved by the a system of the present invention is generally as good or better for throughput, and much better on CPU usage than the custom rendering engines it is intended to replace.

The system has shown itself to be easy to port to new and differing architectures. Porting a product that uses the present invention from one platform to another has been easy. Turn around times of as little as a week have been achieved with full products. More commonly a product port takes about a month, including required revisions to art assets to take into account platform performance differences.

The render method paradigm has also proved successful, with users greatly extending the functionality of the system by writing their own render methods. This has included such features as a crowd rendering system (seen in FIG. 4), multiple particle systems (an example is seen in FIG. 5), as well as specialized multi-texture and multi-pass effects.

Additionally, where the compiler front end semantics maybe insufficient to support the needs of the user, new front ends may be developed using the teachings of the present invention. For example, new front ends have been developed and successfully deployed. For example, the cityscape seen FIG. 5 contains many objects that share substantial portions of their geometric data. A custom front end was written that allowed this data to be shared across models using the hooks provided to externally linked variables.

All references included herein are hereby incorporated by reference in their entirety.

It should be appreciated that code for implementing all or parts of the present invention can be stored and provided on a computer readable medium such as a CD, DVD or floppy media disk, for distribution. Such code includes instructions for controlling platform intelligence (e.g., CPU 110 and/or GPU 120) to implement some or all of the various features and aspects of the present invention, including compilation aspects and rendering aspects, as taught herein.

While the invention has been described by way of example and in terms of the specific embodiments, it is to be understood that the invention is not limited to the disclosed embodiments. To the contrary, it is intended to cover various modifications and similar arrangements, in addition to those discussed above, as would be apparent to those skilled in the art. Therefore, the scope of the appended claims should be accorded the broadest interpretation so as to encompass all such modifications and similar arrangements.

What is claimed is:

1. A method of generating optimized code for rendering an art asset at runtime in a computer, comprising:
    providing an art asset and one or more render methods associated with the art asset to a front end of a compiler;
    generating one or more packets in the front end of the compiler, each packet representing a fragment of the art asset and an individual call to one of the one or more render methods; and
    generating optimized code and data streams in a back end of the compiler using the one or more packets, wherein the optimized code and data streams are used to render the art asset on a display at runtime.

2. The method of claim 1, wherein the render methods include a declaration of shader input variables.

3. The method of claim 1, wherein the art asset includes polygonal geometric data.

4. The method of claim 1, wherein generating optimized code in the back end includes:
    instantiating each packet, each instantiated packet including one or both of hard variable data and soft variable data, said soft data identifying external data; and
    generating a rendering data structure for the art asset, wherein the rendering data structure holds the variable data associated with the hard and soft data of the one or more instantiated packets.

5. The method of claim 4, wherein the rendering data structure is substantially hardware platform specific.

6. The method of claim 4, further including generating a byte code program for each instantiated packet.

7. The method of claim 6, further including:
    catenating each byte code program so as to produce a resulting program; and
    performing global optimizations on the resulting program.

8. The method of claim 7, wherein performing global optimizations includes one or both of performing data transfer operations and redundant code removal operations.

9. The method of claim 4, further including, prior to instantiating the packets, reordering the packets based on one or more of the geometry, the render method, the textures and the matrix palette associated with each packet.

10. The method of claim 4, wherein instantiating the packets includes executing, for each packet, one or more converter functions specified by the individual render method called.

11. The method of claim 4, further including, prior to generating the rendering data structure, generating, based on the hard and soft data of the one or more packets, a dictionary data structure including pointers to memory locations holding the variable data associated with the hard and soft variable data.

12. The method of claim 1, wherein generating optimized code in the back end includes:
reordering the packets based on one or more of the geometry, the render method, the textures and the matrix palette associated with each packet;
instantiating each packet, each instantiated packet including one or both of hard variable data and soft variable data, said soft data identifying external data;
generating, based on the hard and soft data of the one or more packets, a dictionary data structure including pointers to memory locations holding the variable data associated with the hard and soft variable data;
generating a rendering data structure for the art asset, wherein the rendering data structure holds the variable data associated with the hard and soft data of the one or more instantiated packets;
generating a byte code program for each instantiated packet;
catenating each byte code program so as to produce a resulting program; and
performing global optimizations on the resulting program.

13. A computer readable medium including code for controlling a processor to generate optimized code for rendering an art asset at runtime, the code including instructions to:
receive an art asset and one or more render methods associated with the art asset;
generate one or more packets, each packet representing a fragment of the art asset and an individual call to one of the one or more render methods; and
generate optimized code and data streams using the one or more packets, wherein the optimized code and data streams are used to render the art asset on a display at runtime.

14. The computer readable medium of claim 13, wherein the instructions to receive an art asset and generate one or more packets are implemented in a front end of a compiler process executing on the processor, and wherein the instructions to generate optimized code are implemented in a back end of the compiler process.

15. The computer readable medium of claim 13, wherein the instructions to generate optimized code include instructions to:
instantiate each packet, each instantiated packet including one or both of hard variable data and soft variable data, said soft data identifying external data; and
generate a rendering data structure for the art asset, wherein the rendering data structure holds the variable data associated with the hard and soft data of the one or more instantiated packets.

16. The computer readable medium of claim 15, wherein the instructions to generate optimized code further include instructions to generate optimized code further include instructions to generate a byte code program for each instantiated packet.

17. The computer readable medium of claim 16, wherein the instructions to generate optimized code include instructions to:
catenate each byte code program so as to produce a resulting program; and
perform global optimizations on the resulting program.

18. The computer readable medium of claim 15, further including instructions to reorder the packets, prior to instantiating the packets, based on one or more of the geometry, the render method, the textures and the matrix palette associated with each packet.

19. The computer readable medium of claim 15, wherein the instructions to instantiate include instructions to execute, for each packet, one or more converter functions specified by the individual render method called.

20. The computer readable medium of claim 15, further including instructions to, prior to generating the rendering data structure, generate, based on the hard and soft data of the one or more packets, a dictionary data structure including pointers to memory locations holding the variable data associated with the hard and soft variable data.

21. The computer readable medium of claim 13, wherein the instructions to generate optimized code includes instructions to:
reorder the packets based on one or more of the geometry, the render method, the textures and the matrix palette associated with each packet;
instantiate each packet, each instantiated packet including one or both of hard variable data and soft variable data, said soft data identifying external data;
generate, based on the hard and soft data of the one or more packets, a dictionary data structure including pointers to memory locations holding the variable data associated with the hard and soft variable data;
generate a rendering data structure for the art asset, wherein the rendering data structure holds the variable data associated with the hard and soft data of the one or more instantiated packets;
generate a byte code program for each instantiated packet;
catenate each byte code program so as to produce a resulting program; and
perform global optimizations on the resulting program.

* * * * *